UNITED STATES PATENT OFFICE.

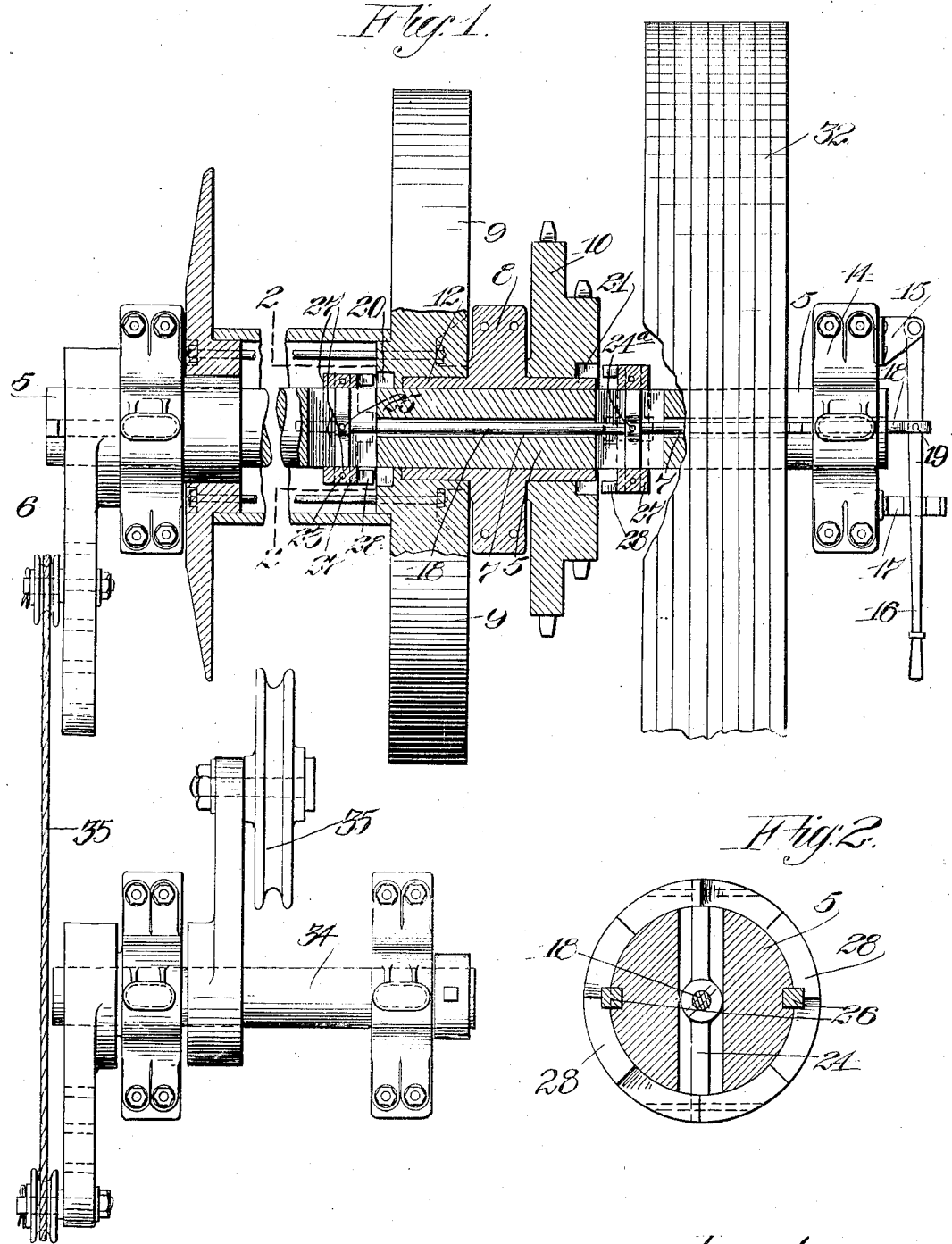

WILSON B. WIGLE, OF LOS ANGELES, CALIFORNIA, ASSIGNOR OF ONE-THIRD TO WILLIAM F. SCOTT, OF TAFT, CALIFORNIA, AND ONE-THIRD TO JOHN H. McBRIDE, OF LOS ANGELES, CALIFORNIA.

CLUTCH.

1,110,519.  Specification of Letters Patent.  Patented Sept. 15, 1914.

Application filed September 2, 1913. Serial No. 787,683.

*To all whom it may concern:*

Be it known that I, WILSON B. WIGLE, a citizen of the Dominion of Canada, residing at Los Angeles, in the county of Los Angeles, State of California, have invented new and useful Improvements in Clutches, of which the following is a specification.

This invention relates to clutches adapted for use in connection with well drilling mechanisms, especially to portable well drilling oil "rigs," and the principal object is to provide a shaft with a clutching mechanism, whereby the various structures mounted thereon may be thrown into or out of driving engagement.

It is also an object to provide independent concentric bearings for the bull-wheel so that the shaft carried through the structures concentrically mounted thereon will not tend to move these structures unless clutched therewith.

It is a further object to provide a shaft having a central bore therein by which the clutch members keyed thereon are operated.

In the drawings accompanying this specification and forming therewith part of the application for Letters Patent: Figure 1 is a plan view of a bull shaft wheel and sand reel pinion concentrically mounted in relation thereto, portions of the device being shown in section. Fig. 2 is a cross section through the shaft on the line 2—2 of Fig. 1, viewed in the direction indicated by the arrows.

More specifically in the drawings, 5 designates a shaft having mounted on one end thereof a crank 6, the oppositely disposed end being provided with a bore 7 which extends a suitable distance within the shaft and preferably beyond the gudgeon or bearing 8 provided for the bull wheel 9 and the sand reel pinion 10, as well as a gearing for the shaft. The crank end of the shaft is also supported in the gudgeon 11 which is also provided with a sleeved bearing upon which the opposite end of the bull wheel is mounted, from that having a bearing upon the sleeve 12 formed upon the gudgeon 8.

The end of the shaft having a bore therein is provided with a bearing 14 of simple form to which is secured the bracket 15 carrying the operating lever 16, this lever being adapted to engage in a rack 17 secured to the opposite side of the bearing. Mounted within the bore in the shaft is the clutch operating rod 18 which is reciprocated within the shaft by means of the operating lever 16, the rod 18 being pivotally secured thereto by means of the pin 19 fastened through a yoke which embraces the lever 16.

Adjacent the oppositely disposed faces of the bull wheel, and sand reel pinion, which are notched as designated by the numerals 20 and 21, the shaft is slotted transversely, the slots intersecting the bore 7 therein and are preferably rectangular in form and are adapted to provide therein for the reciprocation of the transversely disposed bars 23 and 24, which are secured to the reciprocating rod 18 by means of pins 24ᵃ and 25 respectively. The periphery of the shaft intermediate these slots is provided with grooves which are formed parallel with the slots to provide seats for the keys 26 on the slotted clutch sleeves 27 secured to the bars 22 and 23. These clutch sleeves are preferably of the general configuration shown having teeth 28 which fit within the annularly disposed notches 20 and 21 on the bull wheel and pinion respectively.

The operation of the clutching device will be readily understood, with the lever in the position shown in Fig. 1, neither the bull wheel or the sand reel pinion are effected by the movement of the shaft driven by a belt not shown connected to the drive wheel 32, the shaft being shown as connected by means 33 to the crank arm 6 to a shaft 34 upon which is mounted the spudding mechanism 35.

What I claim is:

1. A clutch mechanism for drilling rigs, comprising a shaft and bearings therefor, an intermediate bearing for said shaft having concentric sleeves formed thereon, means to support a bull wheel and sand reel pinion upon said sleeves independent of said shaft, clutch members carried on said shaft adapted to engage said bull wheel or sand reel pinion, and means operable through a bore in said shaft to operate said clutch members.

2. A clutch mechanism, comprising a slotted shaft having a central bore communicating with said slots and extending therethrough, a plurality of toothed sleeves mounted adjacent said slots, members mounted adjacent said shaft and adapted to be engaged by said teeth on said sleeves, connecting means between the walls of said toothed sleeves mounted in said slot, a rod connecting said connecting means mounted in and extending beyond the end of said central bore, in said shaft and means to move said rod to move said toothed sleeves.

3. A clutch mechanism for bull wheel shafts, comprising a shaft having a plurality of slots transversely formed therein, and a bore extending from said slots concentrically within said shaft to one end thereof, sleeved bearings adapted to support said shaft, a bull wheel adapted to be supported on a pair of said sleeves on said bearings, a sand reel connection mounted on another of said sleeves of said bearing, each of said wheels being provided with notches adapted to engage clutch members, sleeved clutch members mounted adjacent said slots on said shaft, means to connect said pairs of clutch members, a rod adapted to connect said clutch member connections, and means to positively reciprocate said rod to operate said clutch members to alternately engage or disengage said bull wheel and sand reel pinion from said shaft.

In witness that I claim the foregoing I have hereunto subscribed my name this 18th day of August, 1913.

WILSON B. WIGLE.

Witnesses:
W. P. KEENE,
MARIE BATTEY.